(12) United States Patent
O'Brien et al.

(10) Patent No.: US 9,010,377 B1
(45) Date of Patent: Apr. 21, 2015

(54) ELECTRONIC PLUMBING FIXTURE FITTING

(75) Inventors: Timothy John O'Brien, Shaker Heights, OH (US); Louise M. Quigley, Rocky River, OH (US); Inho Song, Chesterland, OH (US)

(73) Assignee: Moen Incorporated, North Olmsted, OH (US)

( * ) Notice: Subject to any disclaimer, the term of this patent is extended or adjusted under 35 U.S.C. 154(b) by 93 days.

(21) Appl. No.: 13/525,946

(22) Filed: Jun. 18, 2012

Related U.S. Application Data

(60) Provisional application No. 61/498,182, filed on Jun. 17, 2011.

(51) Int. Cl.
F16K 21/00 (2006.01)
F16K 13/08 (2006.01)

(52) U.S. Cl.
CPC ..................... *F16K 13/08* (2013.01)

(58) Field of Classification Search
CPC .......... E03C 1/057; E03D 5/105; F16K 31/05
USPC .................. 137/624.11, 624.12, 624.21, 801; 251/129.03, 129.04; 4/623
See application file for complete search history.

(56) References Cited

U.S. PATENT DOCUMENTS

| | | |
|---|---|---|
| 4,688,277 A | 8/1987 | Kakinoki et al. |
| 4,762,273 A | 8/1988 | Gregory et al. |
| 4,839,039 A | 6/1989 | Parsons et al. |
| 5,092,560 A | 3/1992 | Chen |
| 6,003,170 A | 12/1999 | Humpert et al. |
| 6,341,389 B2 | 1/2002 | Philipps-Liebich et al. |
| 6,363,549 B2 * | 4/2002 | Humpert et al. ................. 4/623 |
| RE37,888 E * | 10/2002 | Cretu-Petra ................ 236/12.12 |
| 6,481,634 B1 | 11/2002 | Zosimadis |
| 6,874,535 B2 * | 4/2005 | Parsons et al. ................ 137/607 |
| 6,962,168 B2 | 11/2005 | McDaniel et al. |
| 7,014,166 B1 | 3/2006 | Wang |
| 7,083,156 B2 | 8/2006 | Jost et al. |
| 7,150,293 B2 | 12/2006 | Jonte |
| 7,232,111 B2 | 6/2007 | McDaniel et al. |
| 7,464,418 B2 | 12/2008 | Seggio et al. |
| 7,537,023 B2 | 5/2009 | Marty et al. |
| 7,537,195 B2 | 5/2009 | McDaniel et al. |
| 7,584,898 B2 | 9/2009 | Schmitt et al. |
| 7,624,757 B2 | 12/2009 | Schmitt |
| 7,690,395 B2 | 4/2010 | Jonte et al. |
| RE42,005 E | 12/2010 | Jost et al. |
| 7,921,480 B2 * | 4/2011 | Parsons et al. ..................... 4/313 |
| 7,946,504 B2 | 5/2011 | Shapira et al. |
| 7,979,928 B2 | 7/2011 | Allen, Jr. et al. |
| 7,997,301 B2 | 8/2011 | Marty et al. |
| 8,104,113 B2 * | 1/2012 | Rodenbeck et al. .............. 4/623 |
| 8,162,236 B2 | 4/2012 | Rodenbeck et al. |
| 8,348,229 B2 * | 1/2013 | Burns ..................... 251/129.04 |
| 8,364,546 B2 | 1/2013 | Yenni et al. |
| 8,365,767 B2 | 2/2013 | Davidson et al. |

(Continued)

FOREIGN PATENT DOCUMENTS

| | | |
|---|---|---|
| WO | 2007059051 A2 | 5/2007 |
| WO | 2009095879 A2 | 8/2009 |

*Primary Examiner* — Matthew W Jellett
(74) *Attorney, Agent, or Firm* — Calfee, Halter & Griswold LLP

(57) ABSTRACT

The present invention provides an electronic plumbing fixture fitting, such as an electronic faucet.

20 Claims, 6 Drawing Sheets

(56) References Cited

U.S. PATENT DOCUMENTS

| | | | |
|---|---|---|---|
| 8,413,952 B2 | 4/2013 | Lang et al. | |
| 8,418,993 B2 | 4/2013 | Chen | |
| 8,528,579 B2 | 9/2013 | Jonte et al. | |
| 8,561,626 B2 | 10/2013 | Sawaski et al. | |
| 8,572,772 B2 * | 11/2013 | Wolf et al. | 4/623 |
| 8,613,419 B2 | 12/2013 | Rodenbeck et al. | |
| 2005/0253102 A1 | 11/2005 | Boilen | |
| 2006/0138246 A1 | 6/2006 | Stowe et al. | |
| 2006/0186215 A1 | 8/2006 | Logan | |
| 2006/0200903 A1 * | 9/2006 | Rodenbeck et al. | 4/623 |
| 2006/0214016 A1 * | 9/2006 | Erdely et al. | 236/12.12 |
| 2007/0069168 A1 * | 3/2007 | Jonte | 251/129.03 |
| 2007/0157978 A1 * | 7/2007 | Jonte et al. | 137/613 |
| 2008/0099088 A1 * | 5/2008 | Boey | 137/624.11 |
| 2009/0056011 A1 * | 3/2009 | Wolf et al. | 4/623 |
| 2010/0108165 A1 | 5/2010 | Rodenbeck et al. | |
| 2011/0120581 A1 * | 5/2011 | Burns | 137/801 |
| 2011/0185493 A1 * | 8/2011 | Chen | 4/623 |
| 2013/0248019 A1 * | 9/2013 | Frick et al. | 137/468 |
| 2013/0248033 A1 * | 9/2013 | Parikh et al. | 137/801 |
| 2013/0248620 A1 * | 9/2013 | Evans et al. | 239/195 |
| 2013/0291978 A1 * | 11/2013 | Baker et al. | 137/801 |

* cited by examiner

ELECTRONIC PLUMBING FIXTURE FITTING

CROSS-REFERENCE TO RELATED APPLICATION

This application claims the benefit of U.S. Provisional Application No. 61/498,182, filed Jun. 17, 2011, the entire disclosure of which is hereby incorporated by reference.

FIELD

The present invention relates generally to an electronic plumbing fixture fitting, such as an electronic faucet.

BACKGROUND

Electronic plumbing fixture fittings, such as electronic faucets, are well known. Such electronic plumbing fixture fittings are used in residential and commercial applications, such as in kitchens, bathrooms, and various other locations. An electronic plumbing fixture fitting enables the user of the fitting to operate the fitting without manually moving a handle, lever, knob, or other mechanical device. Thus, the electronic plumbing fixture fitting can still be operated if the user's hands are busy or dirty.

Typically, electronic plumbing fixture fittings have a single triggering mechanism. However, some electronic plumbing fixture fittings have multiple triggering mechanisms. For electronic plumbing fixture fittings with multiple triggering mechanisms, the user may be confused as to which triggering mechanism is active at any given time.

SUMMARY

The present invention provides an electronic plumbing fixture fitting. In an exemplary embodiment, the electronic plumbing fixture fitting comprises a discharge outlet, an electronic valve, a first proximity sensor, and a second proximity sensor. The discharge outlet is operable to deliver water to a user. The electronic valve is operable to permit flow of water through the discharge outlet when the electronic valve is activated and to prevent flow of water through the discharge outlet when the electronic valve is deactivated. The first proximity sensor defines a first zone and is operable to activate the electronic valve when an object enters the first zone. The second proximity sensor defines a second zone and is operable to activate the electronic valve when an object enters the second zone. While the electronic valve is activated based on a triggering of the first proximity sensor, the electronic valve cannot be deactivated based on a triggering of the second proximity sensor. While the electronic valve is activated based on a triggering of the second proximity sensor, the electronic valve can be deactivated based on a triggering of the first proximity sensor.

In another exemplary embodiment, the electronic plumbing fixture fitting comprises a discharge outlet, an electronic valve, a first sensor, and a second sensor. The discharge outlet is operable to deliver water to a user. The electronic valve is operable to permit flow of water through the discharge outlet when the electronic valve is activated and to prevent flow of water through the discharge outlet when the electronic valve is deactivated. The first sensor defines a first zone and is operable to activate the electronic valve when an object enters the first zone and to deactivate the electronic valve when the object exits and reenters the first zone. The second sensor defines a second zone and is operable to activate the electronic valve when an object enters the second zone and to deactivate the electronic valve when the object exits the second zone. While the electronic valve is activated based on a triggering of the first sensor, the electronic valve cannot be deactivated based on a triggering of the second sensor. While the electronic valve is activated based on a triggering of the second sensor, the electronic valve can be deactivated based on a triggering of the first sensor.

In a further exemplary embodiment, the electronic plumbing fixture fitting comprises a discharge outlet, a mechanical valve, a mechanical valve sensor, an electronic valve, a toggle sensor, and a presence sensor. The discharge outlet is operable to deliver water to a user. The mechanical valve is operable to permit flow of water through the discharge outlet when the mechanical valve is activated and to prevent flow of water through the discharge outlet when the mechanical valve is deactivated. The mechanical valve sensor is operable to determine if water is flowing through the mechanical valve. The electronic valve is operable to permit flow of water through the discharge outlet when the electronic valve is activated and to prevent flow of water through the discharge outlet when the electronic valve is deactivated. The toggle sensor defines a toggle zone and is operable to activate the electronic valve when an object enters the toggle zone and to deactivate the electronic valve when the object exits and reenters the toggle zone. The presence sensor defines a presence zone and is operable to activate the electronic valve when an object enters the presence zone and to deactivate the electronic valve when the object exits the presence zone. While the mechanical valve sensor determines that water is flowing through the mechanical valve, the electronic valve cannot be activated. While the electronic valve is activated, the mechanical valve can be activated. While the electronic valve is activated based on a triggering of the toggle sensor, the electronic valve cannot be deactivated based on a triggering of the presence sensor. While the electronic valve is activated based on a triggering of the presence sensor, the electronic valve can be deactivated based on a triggering of the toggle sensor.

BRIEF DESCRIPTION OF THE DRAWINGS

—FIGS. 3A and 3B illustrate the electronic faucet with the toggle sensor and the presence sensor in an active state, FIG. 3C illustrates the electronic faucet with the toggle sensor in an active state and the presence sensor in an inactive state, and FIG. 3D illustrates the electronic faucet with the toggle sensor in an inactive state and the presence sensor in an active state.

DETAILED DESCRIPTION

The present invention provides an electronic plumbing fixture fitting. In an exemplary embodiment, the electronic plumbing fixture fitting is an electronic faucet. However, one of ordinary skill in the art will appreciate that the electronic plumbing fixture fitting could be an electronic showerhead, an electronic handheld shower, an electronic body spray, or any other electronic plumbing fixture fitting.

Figure 1:
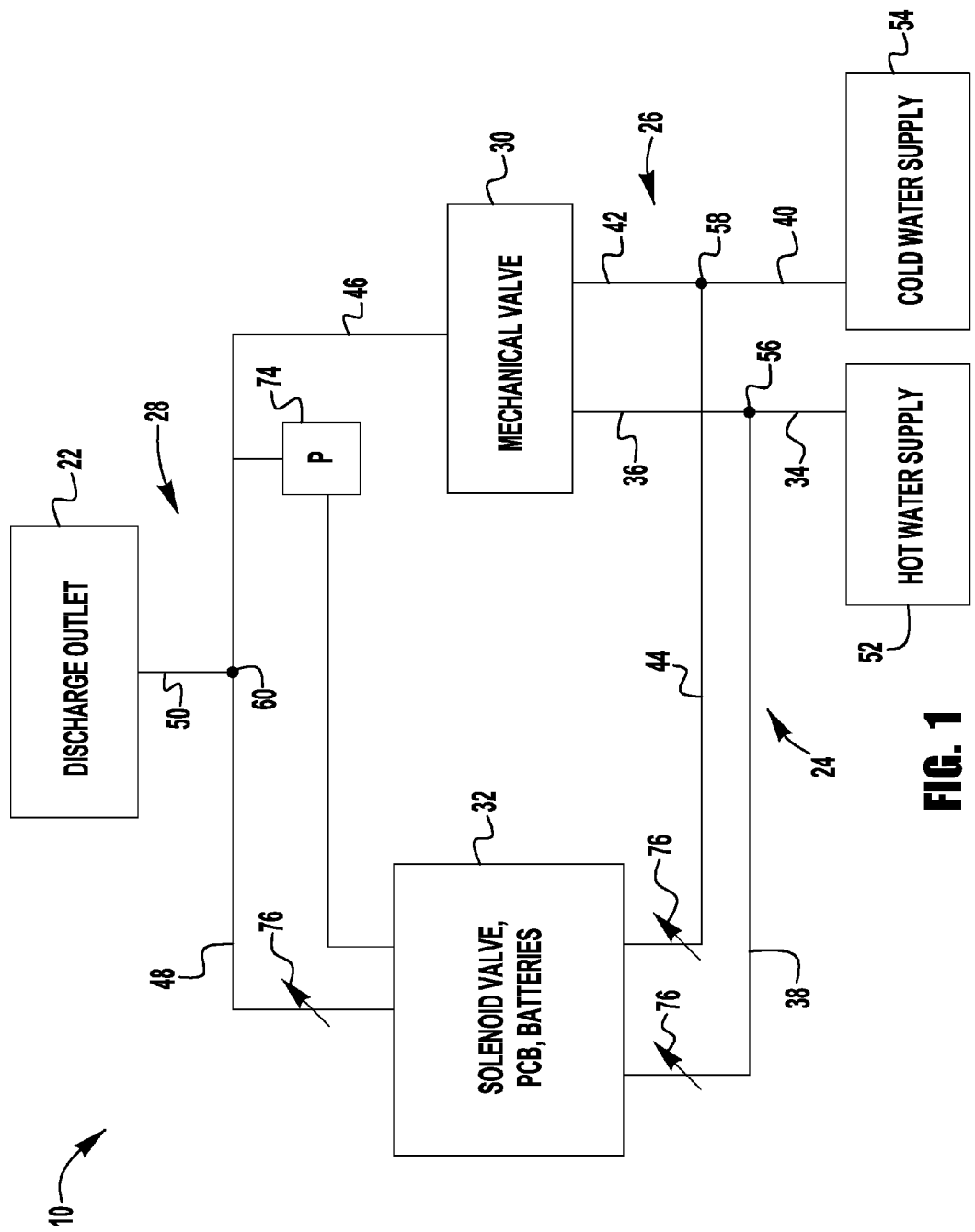
FIG. 1 is a schematic drawing of an electronic plumbing fixture fitting according to an exemplary embodiment of the present invention.
Figure 2:
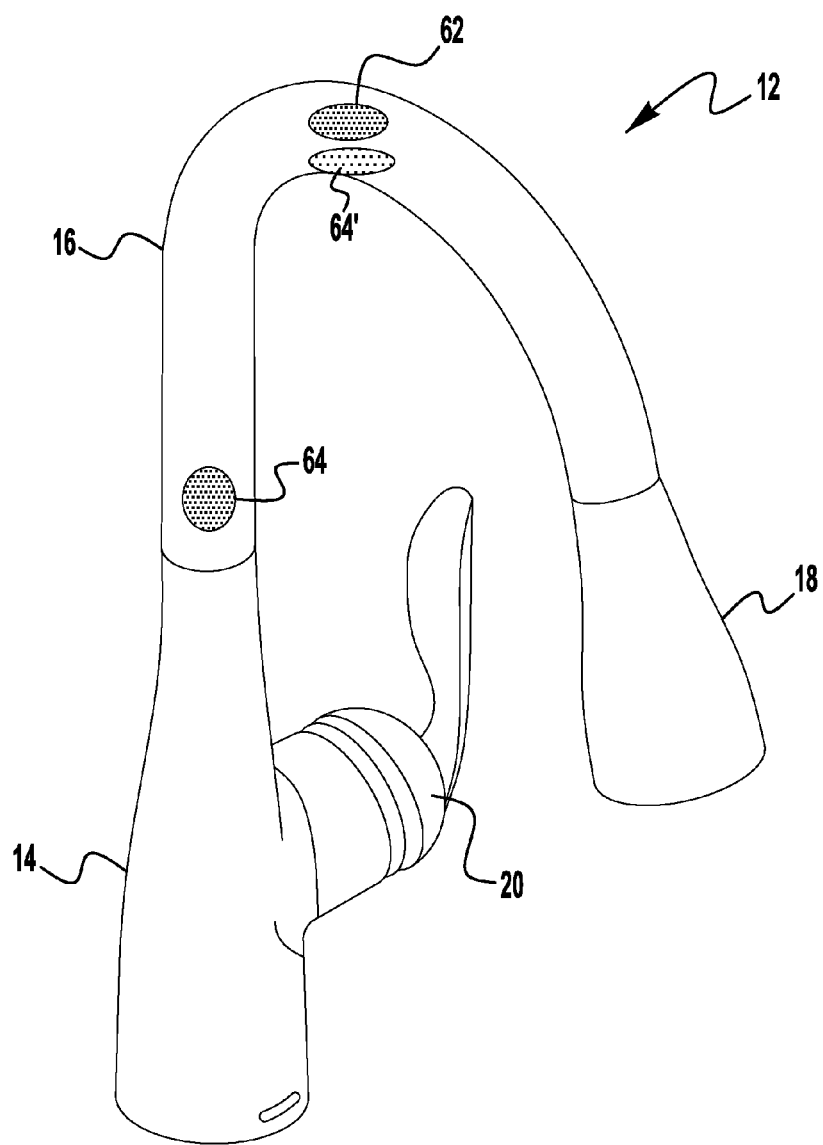
FIG. 2 is a schematic drawing of an electronic faucet according to an exemplary embodiment of the present invention and illustrating exemplary and alternative sensor locations.
Figure 3A:
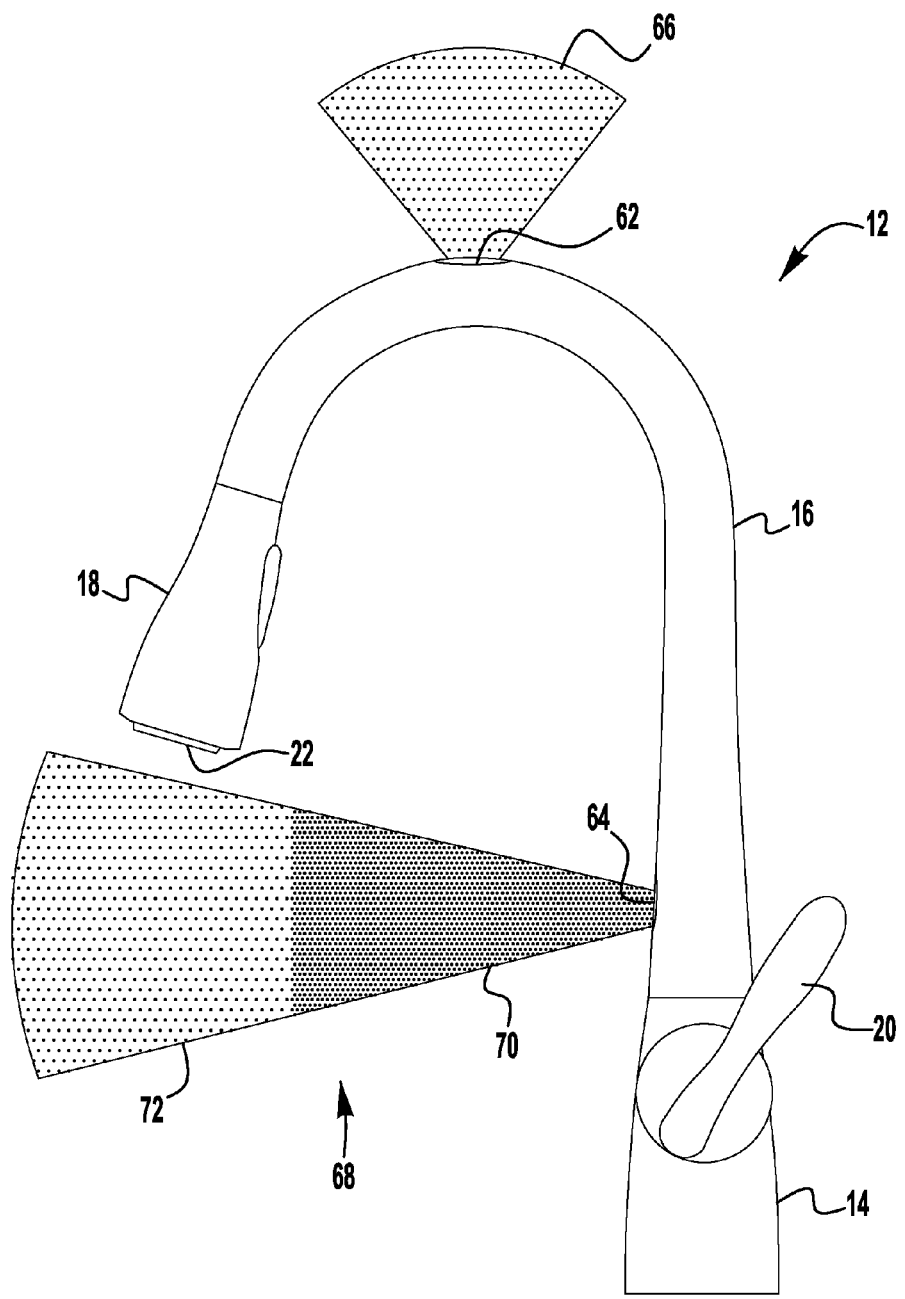
FIGS. 3A-3D are schematic drawings of the electronic faucet of FIG. 2 illustrating a toggle sensor defining a toggle zone and a presence sensor defining a presence zone
Figure 3B:
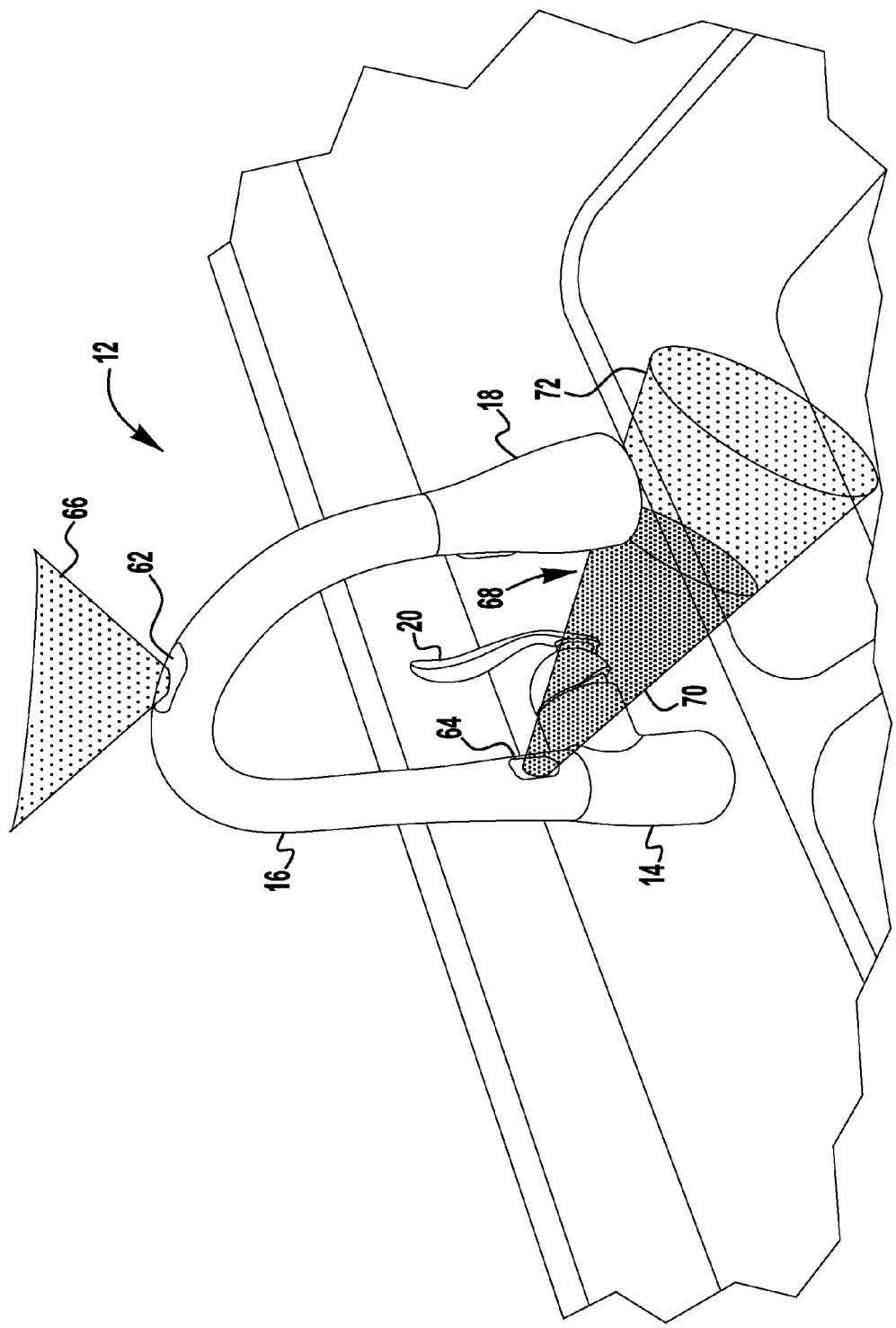
Figure 3C:
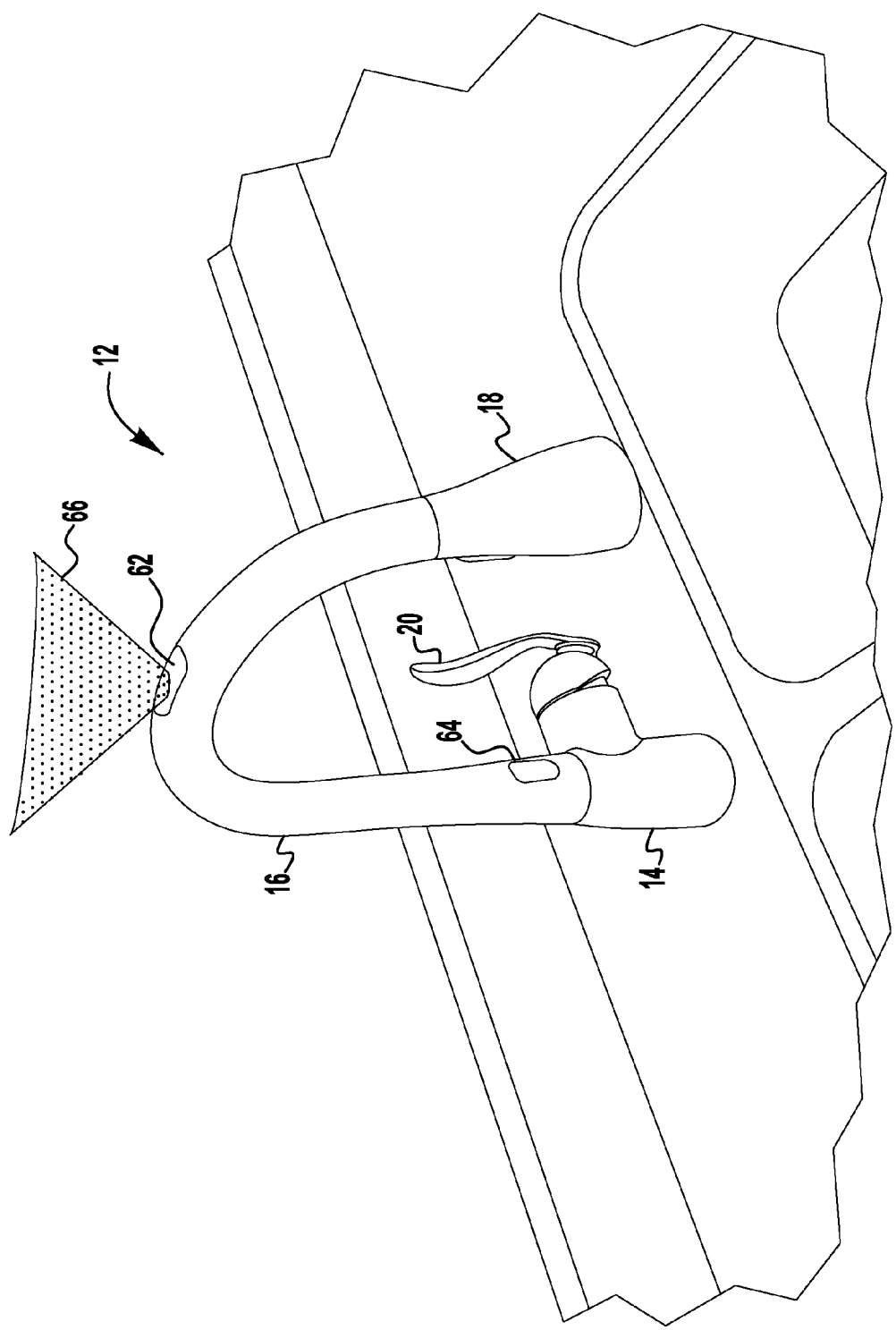
Figure 3D:
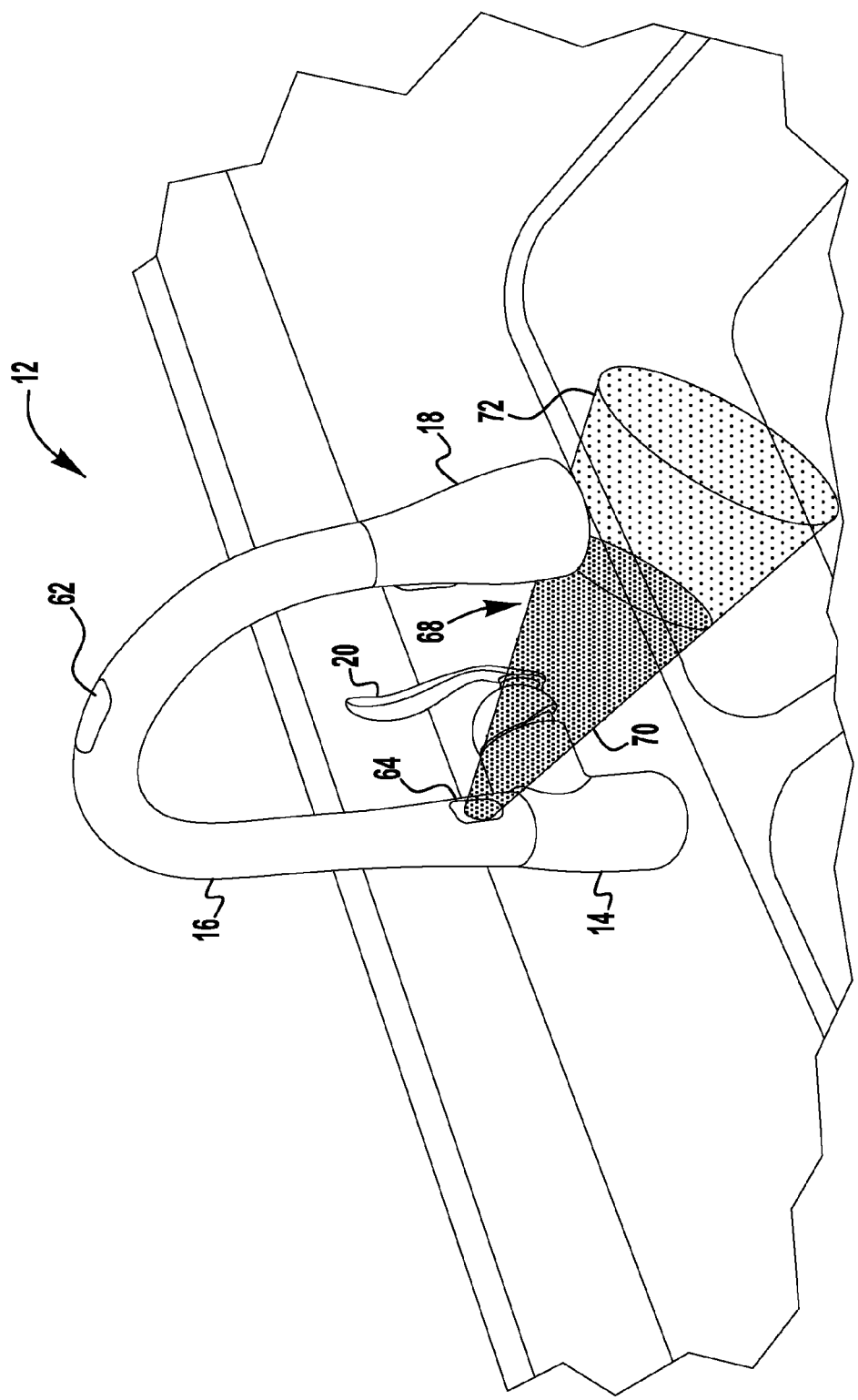

An exemplary embodiment of an electronic plumbing fixture fitting 10, such as an electronic faucet 12, is illustrated in FIG. 1. Exemplary embodiments of the electronic faucet 12 are illustrated in FIGS. 2 and 3A-3D.

In the illustrated embodiments, the faucet 12 includes a hub 14, a spout 16, a flexible hose (not shown), a wand 18, and a handle 20. An upstream end of the hub 14 is connected to a mounting surface (such as a counter or sink). An upstream end of the spout 16 is connected to a downstream end of the hub 14. The spout 16 is operable to rotate relative to the hub 14. The flexible hose extends through the hub 14 and the spout 16 and is operable to move within the hub 14 and the spout 16. An upstream end of the wand 18 is mounted in a downstream end of the spout 16 and is connected to a downstream end of the flexible hose. A downstream end of the wand 18 includes a discharge outlet 22 through which water is delivered from the faucet 12. The wand 18 is operable to be pulled away from the spout 16. The handle 20 is connected to a side of the hub 14 and is operable to be moved relative to the hub 14. Although the faucet 12 has been described as having a rotatable spout 16, a pull-out or pull-down wand 18, and a handle 20 mounted on the hub 14, one of ordinary skill in the art will appreciate that the spout 16 could be fixed relative to the hub 14, the faucet 12 may not include a wand 18, the handle 20 may be mounted on other locations on the faucet 12 or remote from the faucet 12, and/or the handle 20 may be any mechanical device that can be used to operate a mechanical valve.

Additionally, in the illustrated embodiments, the fitting 10 includes a hot water line 24, a cold water line 26, a mixed water line 28, a mechanical valve 30, and an electronic valve 32. The hot water line 24 includes a common portion 34, a mechanical valve portion 36, and an electronic valve portion 38. The cold water line 26 includes a common portion 40, a mechanical valve portion 42, and an electronic valve portion 44. The mixed water line 28 includes a mechanical valve portion 46, an electronic valve portion 48, and a common portion 50.

An upstream end of the common portion 34 of the hot water line 24 connects to a hot water supply 52, and an upstream end of the common portion 40 of the cold water line 26 connects to a cold water supply 54. A downstream end of the common portion 34 of the hot water line 24 connects to a hot water tee 56, and a downstream end of the common portion 40 of the cold water line 26 connects to a cold water tee 58.

An upstream end of the mechanical valve portion 36 of the hot water line 24 connects to the hot water tee 56, and an upstream end of the mechanical valve portion 42 of the cold water line 26 connects to the cold water tee 58. A downstream end of the mechanical valve portion 36 of the hot water line 24 connects to the mechanical valve 30, and a downstream end of the mechanical valve portion 42 of the cold water line 26 connects to the mechanical valve 30.

An upstream end of the electronic valve portion 38 of the hot water line 24 connects to the hot water tee 56, and an upstream end of the electronic valve portion 44 of the cold water line 26 connects to the cold water tee 58. A downstream end of the electronic valve portion 38 of the hot water line 24 connects to the electronic valve 32, and a downstream end of the electronic valve portion 44 of the cold water line 26 connects to the electronic valve 32.

An upstream end of the mechanical valve portion 46 of the mixed water line 28 connects to the mechanical valve 30, and an upstream end of the electronic valve portion 48 of the mixed water line 28 connects to the electronic valve 32. A downstream end of the mechanical valve portion 46 of the mixed water line 28 connects to a mixed water tee 60, and a downstream end of the electronic valve portion 48 of the mixed water line 28 connects to the mixed water tee 60.

An upstream end of the common portion 50 of the mixed water line 28 connects to the mixed water tee 60. A downstream end of the common portion 50 of the mixed water line 28 connects, either directly or indirectly, to the discharge outlet 22.

In the illustrated embodiments, the common portion 50 of the mixed water line 28 is the flexible hose and an upstream end of the flexible hose connects to the mixed water tee 60. As stated above, the downstream end of the flexible hose connects to the upstream end of the wand 18.

As described above, the mechanical valve 30 and the electronic valve 32 are in parallel. However, one of ordinary skill in the art will appreciate that the mechanical valve 30 and the electronic valve 32 could be in series.

In an exemplary embodiment, the electronic valve 32 is a solenoid valve. However, one of ordinary skill in the art will appreciate that the electronic valve 32 could be any type of electronic valve, including, but not limited to, an electronic throttle valve and an electronic mixing valve.

Further, in the illustrated embodiments, the faucet 12 includes a toggle sensor 62 and a presence sensor 64.

In an exemplary embodiment, the toggle sensor 62 is a proximity sensor and, in particular, an infrared sensor. The toggle sensor 62 is also referred to as a latching sensor and a sustained-flow sensor. In the illustrated embodiments, the toggle sensor 62 is mounted on an apex of the spout 16. The toggle sensor 62 defines a toggle zone 66. In an exemplary embodiment, the toggle sensor 62 is operable to activate the electronic valve 32 when an object enters the toggle zone 66 and to deactivate the electronic valve 32 when the object exits and reenters the toggle zone 66. As used herein, an "object" can be any portion of a user's body or any item used by the user to trigger the toggle sensor 62. In the illustrated embodiments, the toggle zone 66 extends generally upwardly from the toggle sensor 62. Additionally, in the illustrated embodiments, the toggle zone 66 has a generally cone-like shape. In an exemplary embodiment, the toggle zone 66 has an opening angle generally in the range of 5 degrees to 180 degrees and a height generally in the range of 2 inches to 3 feet. The opening angle of the zone is an angle made by a cross-section through an apex of the zone and a center of a base of the zone. In one exemplary embodiment, the toggle zone 66 has an opening angle of approximately 90 degrees and a height of approximately 18 inches. In another exemplary embodiment, the toggle zone 66 has an opening angle of approximately 30 degrees and a height of approximately 4 inches.

In an exemplary embodiment, the presence sensor 64 is a proximity sensor, and, in particular, an infrared sensor. The presence sensor 64 is also referred to as a quick-strike sensor. In the illustrated embodiments, the presence sensor 64 is mounted on the upstream end of the spout 16. In the alternative illustrated embodiment, the presence sensor 64' is mounted beneath the apex of the spout 16. The presence sensor 64 defines a presence zone 68. In an exemplary embodiment, the presence sensor 64 is operable to activate the electronic valve 32 when an object enters the presence zone 68 and to deactivate the electronic valve 32 when the object exits the presence zone 68. In one illustrated embodiment, the presence zone 68 includes an immediate presence zone 70 and an extended presence zone 72. In an exemplary embodiment, the presence sensor 64 is operable to activate the electronic valve 32 when an object enters the immediate presence zone 70 (but not the extended presence zone 72), to continue to activate the electronic valve 32 as long as the object is in the immediate presence zone 70 and/or the extended presence zone 72, and to deactivate the electronic valve 32 when the object exits both the immediate presence zone 70 and the extended presence zone 72. Again, as used herein, an "object" can be any portion of a user's body or any item used by the user to trigger the presence sensor 64. In the illustrated embodiments, the presence zone 68 extends generally horizontally from the presence sensor 64. In the alternative illustrated embodiment, the presence zone extends generally downwardly from the presence sensor 64'. Additionally, in the illustrated embodiments, the presence zone 68 has a generally cone-like shape. In an exemplary embodiment, the presence zone 68 has an opening angle generally in the range of 5 degrees to 180 degrees and a height generally in the range of 3 inches to 3 feet. Again, the opening angle of the zone is an angle made by a cross-section through an apex of the zone and a center of a base of the zone. In one exemplary embodiment, the presence zone 68 has an opening angle of approximately 90 degrees and a height of approximately 18 inches. In another exemplary embodiment, the presence zone 68 has an opening angle of approximately 45 degrees and a height of approximately 15 inches.

As described above, the toggle sensor 62 and the presence sensor 64 are proximity sensors and, in particular, infrared sensors. Proximity sensors are sensors that detect the presence of an object without any physical contact. However, one of ordinary skill in the art will appreciate that the toggle sensor 62 and the presence sensor 64 could be any type of electronic sensors that can be triggered, including, but not limited to, other proximity sensors, touch sensors, and image sensors. Exemplary electronic sensors include, but are not limited to, electromagnetic radiation sensors (such as optical sensors and radar sensors), capacitance sensors, inductance sensors, piezo-electric sensors, and multi-pixel optical sensors (such as camera sensors). Moreover, the toggle sensor 62 and the presence sensor 64 may not be the same type of sensor. As further described above, the toggle sensor 62 is mounted on the apex of the spout 16 and the presence sensor 64 is mounted on the upstream end of the spout 16 or, alternatively, the presence sensor 64' is mounted beneath the apex of the spout 16. However, one of ordinary skill in the art will appreciate that the toggle sensor 62 and the presence sensor 64 could be mounted in any location on the faucet 12 or in a location remote from the faucet 12. Furthermore, the toggle sensor 62 and the presence sensor 64 may be located in close proximity to each other or fairly remote from each other.

Similarly, as described above, the sensors are a toggle sensor 62 and a presence sensor 64. However, one of ordinary skill in the art will appreciate that the toggle sensor 62 and the presence sensor 64 could be any type of sensors that provide information useful in determining whether to activate or deactivate the mechanical valve 30 and/or the electronic valve 32, including, but not limited to, flow sensors, pressure sensors, temperature sensors, and position sensors. Moreover, the toggle sensor 62 and the presence sensor 64 may be the same type of sensor.

As will be apparent from the below description, during operation of the faucet 12, the activation and deactivation of the mechanical valve 30 and the electronic valve 32 are governed by a hierarchy that determines which valve to activate or deactivate when more than one action to activate or deactivate a valve occurs at a given time. Under the hierarchy, a valve that ranks lower in the hierarchy cannot be activated while a valve that ranks higher in the hierarchy is activated. However, a valve that ranks higher in the hierarchy can be activated while a valve that ranks lower in the hierarchy is activated. Similarly, under the hierarchy, a sensor that ranks lower in the hierarchy cannot deactivate a valve while the valve is activated based on a triggering of a sensor that ranks higher in the hierarchy. However, a sensor that ranks higher in the hierarchy can deactivate a valve while the valve is activated based on a triggering of a sensor that ranks lower in the hierarchy. In other words, a higher ranking valve or sensor can override a lower ranking valve or sensor, but a lower ranking valve or sensor cannot override a higher ranking valve or sensor. In an exemplary embodiment, the mechanical valve 30 has a higher ranking than the electronic valve 32 and the toggle sensor 62 has a higher ranking than the presence sensor 64.

As used herein, "activate a valve" means to move the valve to or maintain the valve in an open position, regardless of the volume or temperature of the flowing water, "deactivate a valve" means to move the valve to a completely closed position, and "trigger a sensor" means the sensor detects a stimulus (e.g., the presence of an object) and sends a signal to activate or deactivate a valve in response to that detection. Additionally, when reference is made to a sensor that "cannot be triggered," the sensor can be prevented from detecting a stimulus and/or prevented from sending a signal to activate or deactivate a valve in response to a detection. Further, when reference is made to a valve that "cannot be activated," the valve can be prevented from opening and/or the sensor can be prevented from triggering.

During operation of the mechanical valve 30, the user activates and deactivates the mechanical valve 30 using the handle 20. When the user manually moves the handle 20 to an open position, the mechanical valve 30 is activated. While the mechanical valve 30 is activated, the faucet 12 operates as a standard faucet. As with standard faucets, the user can control the volume and temperature of the flowing water by further manually moving the handle 20 in the open position. Additionally, while the mechanical valve 30 is activated, the electronic valve 32 cannot be activated by the user. As described above, this can be accomplished by preventing the electronic valve 32 from opening or preventing the toggle sensor 62 and the presence sensor 64 from triggering. When the user manually moves the handle 20 to a closed position, the mechanical valve 30 is deactivated. While the mechanical valve 30 is deactivated, the electronic valve 32 can be activated and deactivated and the toggle sensor 62 and the presence sensor 64 can be triggered by the user, subject to the hierarchy rules described herein.

In the illustrated embodiments, the faucet 12 includes a pressure sensor 74 in the mechanical valve portion 46 of the mixed water line 28 to determine whether the mechanical valve 30 is activated. However, one of ordinary skill in the art will appreciate that other types of sensors could be used to determine whether the mechanical valve 30 is activated, including, but not limited to, flow sensors and position sensors.

During operation of the electronic valve 32, the user activates and deactivates the electronic valve 32 using the toggle sensor 62 and/or the presence sensor 64.

When the user triggers the toggle sensor 62 (i.e., when an object enters the toggle zone 66), the electronic valve 32 is activated. In an exemplary embodiment, the user cannot control the volume and temperature of the flowing water. While the electronic valve 32 is activated based on a triggering of the toggle sensor 62, the electronic valve 32 cannot be deactivated based on a triggering of the presence sensor 64. When the user again triggers the toggle sensor 62 (i.e., when the object exits and reenters the toggle zone 66), the electronic valve 32 is deactivated. Successive triggering of the toggle sensor 62 alternately activates and deactivates the electronic valve 32. Moreover, while the electronic valve 32 is activated based on a triggering of the toggle sensor 62, the electronic valve 32 can be deactivated by activating the mechanical valve 30 using the handle 20.

Additionally, when the user triggers the presence sensor 64 (i.e., when an object enters the presence zone 68), the electronic valve 32 is activated. In an exemplary embodiment, the user cannot control the volume and temperature of the flowing water. When the user no longer triggers the presence sensor 64 (i.e., when the object exits the presence zone 68), the electronic valve 32 is deactivated. Furthermore, while the electronic valve 32 is activated based on a triggering of the presence sensor 64, the electronic valve 32 can be deactivated by activating the mechanical valve 30 using the handle 20 or triggering the toggle sensor 62.

When reference is made to activating or deactivating a valve "when a sensor is triggered," the valve may be activated or deactivated immediately upon the sensor triggering or a predetermined period of time after the sensor has triggered. Similarly, when reference is made to activating or deactivating a valve "when an object enters a zone" or "when an object exits a zone," the valve may be activated or deactivated immediately upon the object entering or exiting the zone or a predetermined period of time after the object has entered or exited the zone.

In an exemplary embodiment, while the electronic valve 32 is activated, the user cannot electronically control the volume and temperature of the flowing water. Instead, the volume and temperature of the flowing water are mechanically controlled by mechanical apparatus in the electronic valve portion 38 of the hot water line 24, the electronic valve portion 44 of the cold water line 26, and/or the electronic valve portion 48 of the mixed water line 28. In the illustrated embodiments, the mechanical apparatus includes a throttle or choke valve 76 in the electronic valve portion 38 of the hot water line 24, the electronic valve portion 44 of the cold water line 26, and the electronic valve portion 48 of the mixed water line 28. In another exemplary embodiment, the mechanical apparatus includes a mechanical mixing valve in the electronic valve portion 38 of the hot water line 24 and the electronic valve portion 44 of the cold water line 26 as well as a throttle or choke valve in the electronic valve portion 48 of the mixed water line 28. However, one of ordinary skill in the art will appreciate that the faucet 12 could include a mixing and volume controlling electronic valve together with additional sensors and/or a control that would enable the user to electronically control the volume and temperature of the flowing water.

Further, in an exemplary embodiment, the toggle sensor 62 and the presence sensor 64 include a time-out feature. If the electronic valve 32 has been activated for a predetermined period of time without being deactivated by the user, the electronic valve 32 will be automatically deactivated. In an exemplary embodiment, the predetermined period of time is 2 minutes.

The operation of the faucet 12 will be further illustrated with several examples.

In the first example, in order to start the flow of water, the user manually moves the handle 20 to the open position. As a result, the mechanical valve 30 is activated and water flows from the faucet 12. In order to control the volume and temperature of the flowing water, the user manually moves the handle 20 in a conventional manner. While the mechanical valve 30 is activated, the electronic valve 32 cannot be activated by the user. In order to stop the flow of water, the user manually moves the handle 20 to the closed position. As a result, the mechanical valve 30 is deactivated and water stops flowing from the faucet 12. While the mechanical valve 30 is deactivated, the electronic valve 32 can be activated and deactivated and the toggle sensor 62 and the presence sensor 64 can be triggered by the user, subject to the hierarchy rules described herein.

In the second example, in order to start the flow of water, the user triggers the toggle sensor 62 when an object enters the toggle zone 66. As a result, the electronic valve 32 is activated and water flows from the faucet 12. While the electronic valve 32 is activated based on a triggering of the toggle sensor 62, the electronic valve 32 cannot be deactivated based on a triggering of the presence sensor 64. In order to deactivate the electronic valve 32, the user again triggers the toggle sensor 62 when the object exits and reenters the toggle zone 66. As a result, the electronic valve 32 is deactivated and water stops flowing from the faucet 12. Alternatively, in order to deactivate the electronic valve 32, the user can manually move the handle 20 to the open position. As a result, the mechanical valve 30 is activated and the electronic valve 32 is deactivated. In this situation, however, water continues to flow from the faucet 12 because the mechanical valve 30 is activated. In order to stop the flow of water, the user can manually move the handle 20 to the closed position. As a result, the mechanical valve 30 is deactivated and water stops flowing from the faucet 12.

In the third example, in order to start the flow of water, the user triggers the presence sensor 64 when an object enters the presence zone 68. As a result, the electronic valve 32 is activated and water flows from the faucet 12. While the electronic valve 32 is activated based on a triggering of the presence sensor 64, the electronic valve 32 can be deactivated based on a triggering of the toggle sensor 62. As long as the object remains in the presence zone 68, the electronic valve 32 remains activated and water flows from the faucet 12. In order to deactivate the electronic valve 32, the user stops triggering the presence sensor 64 when the object exits the presence zone 68. As a result, the electronic valve 32 is deactivated and water stops flowing from the faucet 12. Alternatively, in order to deactivate the electronic valve 32, the user can trigger the toggle sensor 62 when an object enters the toggle zone 66. As a result, the electronic valve 32 is deactivated and water stops flowing from the faucet 12. Further alternatively, in order to deactivate the electronic valve 32, the user can manually move the handle 20 to the open position. As a result, the mechanical valve 30 is activated and the electronic valve 32 is deactivated. In this situation, however, water continues to flow from the faucet 12 because the mechanical valve 30 is activated. In order to stop the flow of water, the user can manually move the handle 20 to the closed position. As a result, the mechanical valve 30 is deactivated and water stops flowing from the faucet 12. If the electronic valve 32 has been activated using the presence sensor 64, but is deactivated using the toggle sensor 62 or the handle 20 (i.e., the object has not exited the presence zone 68), the presence sensor 64 cannot be again triggered until the object exits and reenters the presence zone 68.

As is now apparent from the above description, during operation of the faucet 12, the activation and deactivation of the mechanical valve 30 and the electronic valve 32 are governed by a hierarchy that determines which valve to activate or deactivate when more than one action to activate or deactivate a valve occurs at a given time. Under the hierarchy, a valve that ranks lower in the hierarchy cannot be activated while a valve that ranks higher in the hierarchy is activated. However, a valve that ranks higher in the hierarchy can be activated while a valve that ranks lower in the hierarchy is activated. Similarly, under the hierarchy, a sensor that ranks lower in the hierarchy cannot deactivate a valve while the valve is activated based on a triggering of a sensor that ranks higher in the hierarchy. However, a sensor that ranks higher in the hierarchy can deactivate a valve while the valve is activated based on a triggering of a sensor that ranks lower in the hierarchy. In other words, a higher ranking valve or sensor can override a lower ranking valve or sensor, but a lower ranking valve or sensor cannot override a higher ranking valve or sensor.

One of ordinary skill in the art will now appreciate that the present invention provides an electronic plumbing fixture fitting, such as an electronic faucet. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. An electronic plumbing fixture fitting, comprising:
   a discharge outlet operable to deliver water;
   an electronic valve, the electronic valve operable to permit flow of water through the discharge outlet when the electronic valve is open and not permit flow of water through the discharge outlet when the electronic valve is closed;
   a first sensor, the first sensor having a rank in a sensor hierarchy, the first sensor having a first zone for hands-free operation of the electronic valve, the first sensor operable to open the electronic valve when an object enters the first zone and close the electronic valve when the object does one of: (i) exit and reenter the first zone, and (ii) exit the first zone; and
   a second sensor, the second sensor having another rank in the sensor hierarchy, the second sensor having a second zone for hands-free operation of the electronic valve, the second sensor operable to open the electronic valve when an object enters the second zone and close the electronic valve when the object does one of: (i) exit and reenter the second zone, and (ii) exit the second zone;
   wherein, during operation of the fitting, the first sensor and the second sensor are both operable at a given time;
   wherein, during operation of the fitting, the sensor hierarchy governs the operation of the first sensor and the second sensor at the given time;
   wherein the first sensor ranks higher in the sensor hierarchy than the second sensor;
   wherein the second sensor is inoperable to close the electronic valve while the electronic valve is open based on a triggering of the first sensor; and
   wherein the first sensor is operable to close the electronic valve while the electronic valve is open based on a triggering of the second sensor.

2. The electronic plumbing fixture fitting of claim 1, wherein the first zone extends at least partially above the discharge outlet.

3. The electronic plumbing fixture fitting of claim 1, wherein the second zone extends at least partially below the discharge outlet.

4. The electronic plumbing fixture fitting of claim 1, wherein the first sensor is mounted above the discharge outlet and the first zone extends generally upwardly from the first sensor.

5. The electronic plumbing fixture fitting of claim 1, wherein the second sensor is mounted below the discharge outlet and the second zone extends generally horizontally from the second sensor.

6. The electronic plumbing fixture fitting of claim 1, wherein the first zone has a generally cone-like shape with an opening angle generally in the range of 5 degrees to 180 degrees and a height generally in the range of 2 inches to 3 feet.

7. The electronic plumbing fixture fitting of claim 1, wherein the second zone has a generally cone-like shape with an opening angle generally in the range of 5 degrees to 180 degrees and a height generally in the range of 3 inches to 3 feet.

8. The electronic plumbing fixture fitting of claim 1, further comprising:
   a mechanical valve, the mechanical valve operable to permit flow of water through the discharge outlet when the mechanical valve is activated and prevent flow of water through the discharge outlet when the mechanical valve is deactivated;
   wherein:
   while the mechanical valve is activated, the electronic valve cannot be activated; and
   while the electronic valve is activated, the mechanical valve can be activated.

9. The electronic plumbing fixture fitting of claim 8, wherein the mechanical valve and the electronic valve are in parallel.

10. An electronic plumbing fixture fitting, comprising:
    a discharge outlet operable to deliver water;
    an electronic valve, the electronic valve operable to permit flow of water through the discharge outlet when the electronic valve is open and not permit flow of water through the discharge outlet when the electronic valve is closed;
    a toggle sensor, the toggle sensor having a rank in a sensor hierarchy, the toggle sensor having a toggle zone for hands-free operation of the electronic valve, the toggle sensor operable to open the electronic valve when an object enters the toggle zone and close the electronic valve when the object exits and reenters the toggle zone such that, when the toggle sensor is triggered, the electronic valve remains open until the toggle sensor is again triggered; and
    a presence sensor, the presence sensor having another rank in the sensor hierarchy, the presence sensor having a presence zone for hands-free operation of the electronic valve, the presence sensor operable to open the electronic valve when an object enters the presence zone and close the electronic valve when the object exits the presence zone such that, when the presence sensor is triggered, the electronic valve remains open until the presence sensor is no longer triggered;
    wherein, during operation of the fitting, the toggle sensor and the presence sensor are both operable at a given time;
    wherein, during operation of the fitting, the sensor hierarchy governs the operation of the toggle sensor and the presence sensor at the given time;
    wherein the toggle sensor ranks higher in the sensor hierarchy than the presence sensor;
    wherein the presence sensor is inoperable to close the electronic valve while the electronic valve is open based on a triggering of the toggle sensor; and
    wherein the toggle sensor is operable to close the electronic valve while the electronic valve is open based on a triggering of the presence sensor.

11. The electronic plumbing fixture fitting of claim 10, wherein the toggle zone extends at least partially above the discharge outlet.

12. The electronic plumbing fixture fitting of claim 10, wherein the presence zone extends at least partially below the discharge outlet.

13. The electronic plumbing fixture fitting of claim 10, wherein the toggle sensor is mounted above the discharge outlet and the toggle zone extends generally upwardly from the toggle sensor.

14. The electronic plumbing fixture fitting of claim 10, wherein the presence sensor is mounted below the discharge outlet and the presence zone extends generally horizontally from the presence sensor.

15. The electronic plumbing fixture fitting of claim 10, wherein the toggle zone has a generally cone-like shape with an opening angle generally in the range of 5 degrees to 180 degrees and a height generally in the range of 2 inches to 3 feet.

16. The electronic plumbing fixture fitting of claim 10, wherein the presence zone has a generally cone-like shape with an opening angle generally in the range of 5 degrees to 180 degrees and a height generally in the range of 3 inches to 3 feet.

17. The electronic plumbing fixture fitting of claim 10, further comprising:
a mechanical valve, the mechanical valve operable to permit flow of water through the discharge outlet when the mechanical valve is activated and prevent flow of water through the discharge outlet when the mechanical valve is deactivated;
wherein:
while the mechanical valve is activated, the electronic valve cannot be activated; and
while the electronic valve is activated, the mechanical valve can be activated.

18. The electronic plumbing fixture fitting of claim 17, wherein the mechanical valve and the electronic valve are in parallel.

19. An electronic plumbing fixture fitting, comprising:
a discharge outlet operable to deliver water;
a mechanical valve, the mechanical valve having a rank in a valve hierarchy, the mechanical valve operable to permit flow of water through the discharge outlet when the mechanical valve is open and not permit flow of water through the discharge outlet when the mechanical valve is closed;
an electronic valve, the electronic valve having another rank in the valve hierarchy, the electronic valve operable to permit flow of water through the discharge outlet when the electronic valve is open and not permit flow of water through the discharge outlet when the electronic valve is closed;
a first sensor, the first sensor having a rank in a sensor hierarchy, the first sensor having a first zone for hands-free operation of the electronic valve, the first sensor operable to open the electronic valve when an object enters the first zone and close the electronic valve when the object does one of: (i) exit and reenter the first zone, and (ii) exit the first zone; and
a second sensor, the second sensor having another rank in the sensor hierarchy, the second sensor having a second zone for hands-free operation of the electronic valve, the second sensor operable to open the electronic valve when an object enters the second zone and close the electronic valve when the object does one of: (i) exit and reenter the second zone, and (ii) exit the second zone;
wherein, during operation of the fitting, the mechanical valve and the electronic valve are both operable at a given time;
wherein, during operation of the fitting, the first sensor and the second sensor are both operable at the given time;
wherein, during operation of the fitting, the valve hierarchy governs the operation of the mechanical valve and the electronic valve at the given time;
wherein, during operation of the fitting, the sensor hierarchy governs the operation of the first sensor and the second sensor at the given time;
wherein the mechanical valve ranks higher in the valve hierarchy than the electronic valve;
wherein the first sensor ranks higher in the sensor hierarchy than the second sensor;
wherein the electronic valve cannot be opened while the mechanical valve is open;
wherein the mechanical valve can be opened while the electronic valve is open;
wherein the second sensor is inoperable to close the electronic valve while the electronic valve is open based on a triggering of the first sensor; and
wherein the first sensor is operable to close the electronic valve while the electronic valve is open based on a triggering of the second sensor.

20. The electronic plumbing fixture fitting of claim 19, wherein the mechanical valve and the electronic valve are in parallel.

* * * * *